United States Patent
Nielsen et al.

(10) Patent No.: US 7,070,818 B1
(45) Date of Patent: Jul. 4, 2006

(54) AERATED NON-CARIOGENIC LOW-CALORIE SUGARLESS CHEWING GUM

(75) Inventors: Hans Erik Nielsen, Hovedgaard (DK); Nesim Acar, Istanbul (TR); Albert Levi, Istanbul (TR)

(73) Assignee: Dandy Sakiz ve Sekerleme Sanayi A.S., Istanbul (TR)

( * ) Notice: Subject to any disclaimer, the term of this patent is extended or adjusted under 35 U.S.C. 154(b) by 0 days.

(21) Appl. No.: 10/240,440

(22) PCT Filed: Apr. 12, 2000

(86) PCT No.: PCT/TR00/00019

§ 371 (c)(1),
(2), (4) Date: Oct. 1, 2002

(87) PCT Pub. No.: WO01/76384

PCT Pub. Date: Oct. 18, 2001

(51) Int. Cl.
*A23G 3/30* (2006.01)

(52) U.S. Cl. .......................................... 426/3
(58) Field of Classification Search .................. 426/3, 426/5; 424/48, 440
See application file for complete search history.

(56) References Cited

U.S. PATENT DOCUMENTS

| | | | | |
|---|---|---|---|---|
| 3,590,120 A | * | 6/1971 | Muhler | 424/48 |
| 4,952,407 A | * | 8/1990 | Record et al. | 424/440 |
| 5,139,797 A | | 8/1992 | Huzinec et al. | |
| 5,154,939 A | | 10/1992 | Broderick et al. | |
| 5,324,530 A | * | 6/1994 | Kehoe et al. | 426/516 |
| 5,702,687 A | * | 12/1997 | Miskewitz | 424/52 |
| 6,235,318 B1 | * | 5/2001 | Lombardy et al. | 426/3 |
| 6,303,159 B1 | * | 10/2001 | Barkalow et al. | 426/5 |
| 6,733,818 B1 | * | 5/2004 | Luo et al. | 426/660 |

FOREIGN PATENT DOCUMENTS

WO    WO 98/34497    8/1998

* cited by examiner

*Primary Examiner*—Arthur L. Corbin
(74) *Attorney, Agent, or Firm*—Alston & Bird LLP

(57) ABSTRACT

The present invention is related to an aerated sugarless gum product with improved plaque reduction properties. The gum is non-cariogenic low-kilocalorie with low density and has a gum base content above 90%. The product is aerated to improve flexibility and softness. Preferred density is between 0.50 gram/milliliter to 0.90 gram/milliliter. The product has good elastic chewing properties and good bubble forming properties.

17 Claims, 1 Drawing Sheet

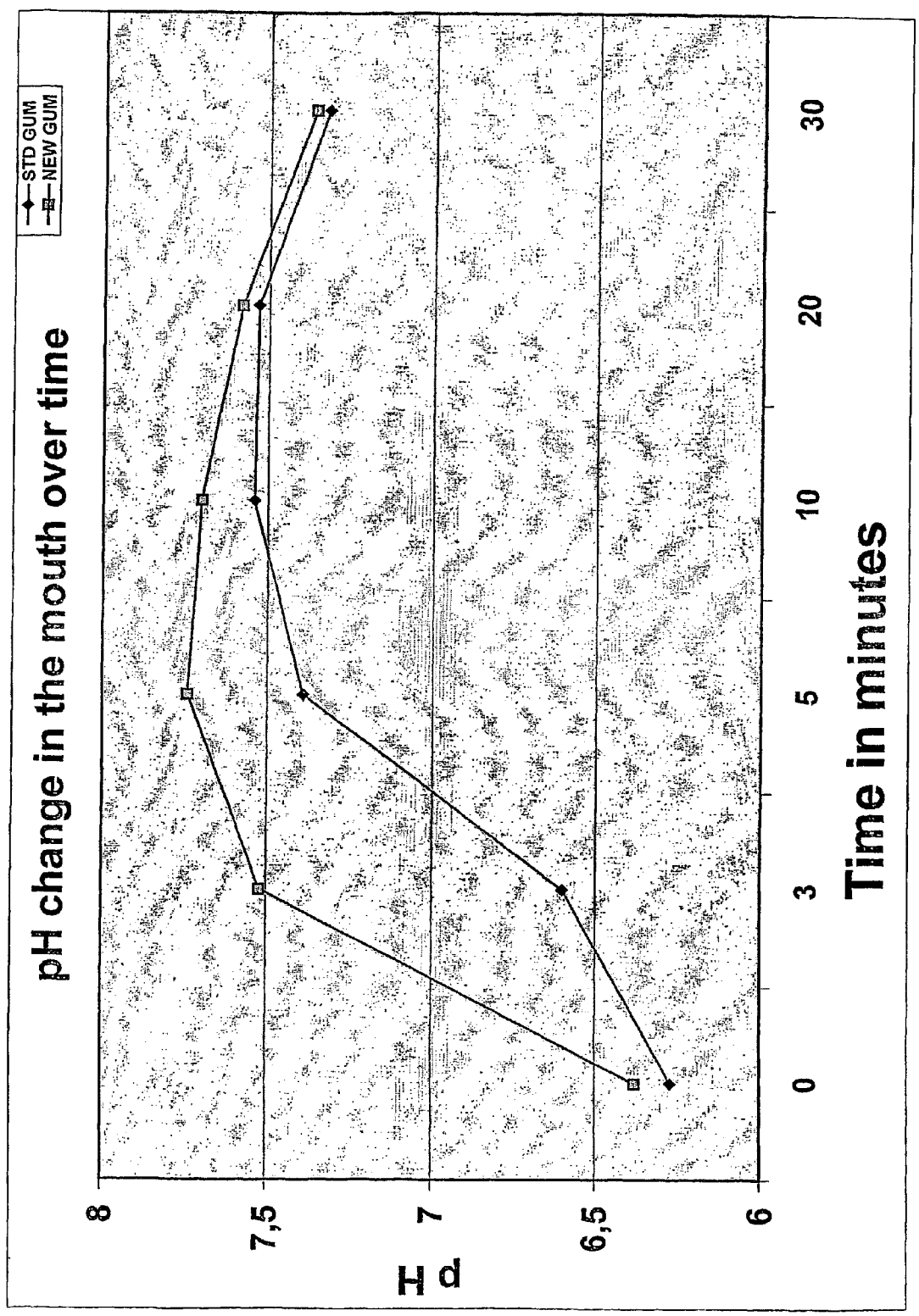

AERATED NON-CARIOGENIC LOW-CALORIE SUGARLESS CHEWING GUM

FIELD OF THE INVENTION

The present invention is related to an aerated sugarless gum product with improved plaque reduction properties. The gum is non-caliogenic low-calorie with low density and has a gum base content above 90%. The product is aerated to improve flexibility and softness. Preferred density is between 0.50 gram/milliliter to 0.90 gram/milliliter. The product has good elastic chewing properties and good bubble forming properties.

The present invention describes a gum product that has excellent tooth cleaning property. The gum is added carbonates and bicarbonates selected from sodium carbonate, sodium bicarbonate, potassium carbonate, and potassium bicarbonate or mixtures hereof to improve oral hygiene by neutralising the acid created from bacterial degradation of remaining food particles in the mouth after eating or drinking. Besides, carbonate or bicarbonate or mixtures thereof reduces the risk of carries significantly by keeping the pH above 5.5 in the mouth.

The mixture of carbonates and bicarbonates in the present invention shows quick remineralisation of the saliva and thus pH raises above 7.5 to prevent the formation of plaque. The carbonic acid created from the reaction between the carbonate and bicarbonate and the water in the human saliva is known as a good calcium remover. This is important as calcium from the food would then later have formed plaque on teeth.

The flavored gum can be added an intensive sweetener to improve the flavor perception. This makes the product more satisfactory for the consumers because of higher flavor perception and long lasting flavor.

The final product has a pure white color with kilocalorie content below 1 kilocalorie per piece. The product has no laxative effect as it lacks bulk sweeteners like sorbitol or xylitol.

BACKGROUND OF THE INVENTION

As it is known, saliva acts as a natural defence mechanism in the mouth in order to maintain good oral hygiene. The saliva flushes the plaque on the teeth and helps to neutralise the acid and wash away sugars. This effect is enhanced if saliva flow after sugary snacks is stimulated—with fruit, vegetables, and cheese for example or with a gum as according to this invention, which has the advantage of prolonging the chewing. At the earliest stages of the decay process, the tooth surface may "heal" by deposition of essential minerals from the saliva. Saliva also helps to wash away the remaining food trapped in the hard-to-reach areas of the mouth.

While chewing the gum, chewing stimulates the production of saliva by up to several times its normal rate. When saliva flow is stimulated, its composition changes, the composition of bicarbonate increases, enhancing its ability to neutralise plaque acid. Also as saliva flow increases, the availability of minerals is increased to repair the early tooth decay.

The present invention describes a gum product that is added a mixture of carbonates and bicarbonates or mixtures hereof, to improve oral hygiene by neutralising the acid created from bacterial degradation of food residue particles in the mouth. Besides, by keeping the pH above 5.5, the risk of carries is also reduced significantly as the acids created in the mouth by bacterial break down is neutralised very fast.

The mixture of carbonates and bicarbonates in the present invention shows good support to a quick demineralisation of the saliva and pH raises quickly during chewing to above 7.5 to prevent the formation of plaque. The carbonic acid created from the reaction between the carbonate and bicarbonate and the water in the human saliva is known as a good calcium remover. This is important due to the calcium from the food would then later have formed plaque on the teeth.

The carbonate and bicarbonate or mixtures hereof in the present invention show good support to the naturally produced bicarbonate in the saliva. First of all, because of the surplus of bicarbonate is released over an extended period of time and also as the carbonate brings pH in the mouth above 7.5, acids created from the food are neutralised immediately. Therefore, acid does not cause carries.

A clinical study has been carried out with 80 persons where the Quinley-hein plaque index (QHPI) has been measured over a period of 6 weeks with intermediate results after 3 weeks. The persons were split in 1 placebo group of 40 persons and a test group of 40 persons.

The placebo group the participants were brushing their teeth for 1 minute a day.

The test group the participants were brushing their teeth for 1 minute a day and they were chewing 3 gums a day after the meals.

Collected data was subsequently summarised by subject wise averages and analysed in the statistic software SAS.

Comparisons among the treatment groups were made using analyses of co-variance (ANCOVA's) in which the baseline scores were employed as co-variable. A level of significance of $\alpha=0{,}05$ was employed in all statistical tests of hypotheses.

The study showed for the whole mouth QHPI score after 3 weeks was 15,8% lower plaque index and after 6 weeks 24,9% lower QHPI plaque index.

The study show that the gum of the present invention will have an improved effect on the oral hygiene due to reduced formation of plaque and especially when chewed after food intake. The gum in the present invention will not create any laxative effect due to the lack of bulk sweeteners like sorbitol or xylitol.

PRIOR ART

The present invention relates to a specific type of gum especially preferred in Turkey, in Middle East countries and former Soviet Union countries. The gum product consists primarily of gum base and flavour without any sweeteners or softeners and is aerated to improve flexibility and softness.

This is a traditional product in this region of the world. Earlier, people were used to chew a resinous substance called gum mastic that is collected from a special pistachio tree. This has been chewed for centuries to keep the mouth moisturised with saliva when people were working in the fields. This tradition has continued until today and people in general like to chew this type of gum.

The local gum industry has developed products in which the gum is based on a gum base containing only synthetic ingredients including styrene butadiene rubber. This is added very low content of flavour and aerated to create the final gum. In the local market this type of product is called "oriental gum".

The flavours used in this type of product is flavours like gum mastic, rose, clover and similar flavours. Today, there are also more widely known flavours introduced like fruit and mint flavors but the traditional flavours are still widely preferred.

The state of the art of this gum is normally prepared with a mixture of gum base and a low content of flavor. The flavor is added to the gum base when the gum base is in molten stage to ensure good distribution of the flavor in the gum base.

The gum base is normally based on SBR rubber as polymer because it shows better pulling properties when being aerated on a pulling machine than other synthetic elastomers like polyisobutylene or butyl rubber do. Then, the gum base flavor mixture is cooled either directly in water and hereafter applied at the pulling machine where the gum is aerated by pulling.

The other production method known is the one described in WO 98/34497. Even in this process the SBR rubber gum base is unique due to its capability to entrap the air bubbles inside the gum base. In this process, gum base is cooled in a heat exchanger before flavor is added. Later the gum base and flavor mixture are mixed with air under pressure and by a relative low temperature environment in the range of 45° C. to 65° C.

In both processes, after aerating stage, almost white gum is extruded to a gum rope and cooled in a cooling tunnel. It is then wrapped in a cut and wrap machine.

The products that are available and known on the chewing gum market today contain certain bicarbonates like sodium bicarbonate with a typical so-called salty taste and can easily be recognized by sensory evaluation by persons skilled in the art she products that are being marketed today always contain a mixture of bulk sweetener like mixtures of sugars or polyols like sorbitol or xylitol.

U.S. Pat. No. 5,139,797 describes a chewing gun comprising a gum base from 90 to 99% by weight of the gum product and sweetened with aspartame and containing an ingestible hygroscopic metal salt. The gum base can also include mineral adjuvants such as calcium carbonate or magnesium carbonate.

BRIEF DESCRIPTION OF THE INVENTION

The present invention describes an aerated sugarless gum with improved oral hygiene properties that is low-calorie, non-cariogenic, low-density with a gum base content about 90% gum base. The gum is aerated with a preferred density between 0.5 gram/milliliter to 0.90 gram/millilitre to improve flexibility and softness. The gum in accordance with the present invention has added active ingredients such as at least one carbonate and one bicarbonate salt and all intensive sweetener or mixtures of intensive sweeteners.

The gum in the present invention has a pure white color and has a kilocalorie value below 1 kilocalorie per piece and has excellent teeth cleaning properties.

The gum in the present invention includes a powder-mixing step after the pulling process and before the extrusion process or directly after the aeration process and before the extrusion if manufactured after the procedure mentioned in WO 98/34497.

The powder mixing is a process where the carbonate and the bicarbonate are added in a co-rotating twin screw. The powder is dosed with a screw dosage unit directly into the continuous added and mixed chewing gum mass. The powder of the carbonate and the bicarbonate and maybe the intensive sweetener is added and distributed homogeneously into the chewing gum mass before leaving the twin screw mixing device.

The present invention includes a combination of carbonates and bicarbonates together with intensive sweeteners. Although not necessary, intensive sweeteners are added for better flavor performance.

The present invention is showing a surprisingly low salty taste because of the presence of bicarbonate in the mixture when prepared after the present invention.

The gum according to this invention may include a dry powder mixture of sodium or potassium carbonate and sodium or potassium bicarbonate with or without an intensive sweetener or mixtures hereof.

The present invention can also include a capsule containing the carbonate and the bicarbonate that is prepared with traditional encapsulation techniques like fluid bed, spray cooling, coasavastion, or flash melt spinning techniques. The capsules can later be coated with wax or fat to prolong the release of the actives. The advantage of this is that flavor perception of the product can be improved significantly.

The mixture of carbonates and bicarbonates used in the present invention causes fast demineralisation of the saliva and also causes to raise the pH to above 7.5 to prevent the formation of plaque. The carbonic acid is known to be a good calcium remover, and this is important as calcium in the food later forms plaque on the teeth.

Various products containing carbonate and bicarbonate mixtures are known from the literature and the following references should be mentioned.

EP 414 932A1 discloses a chewing gum composition which comprises 25 to 90% gum base by weight of a known gum base, from 0.01% to 0.2% by weight of sodium fluoro phosphate, from 0.5% to 40% by weight of calcium carbonate of a particle size of 1 to 80 μm, from 0.2 to 40% of a artificial sweetener, preferably sodium cyclamate, sodium saccharine, xylitol, sorbitol, from 2 to 25% by weight of a softening agent, preferably glycerol, from 1 to 10% by weight of a perfume and/or flavourant, preferably a natural flavourant. The chewing gum composition exerts its anti-cariogenic effect both locally and internally, simultaneously assures a preferable condition for fluoride ions to build into the teeth by mechanical and chemical effect, thus less fluoride compound is needed and the building-in of fluorine ions is accelerated.

WO 97/22264 A1 discloses a chewing gum product that has a content of one or more therapeutic ingredients for improved dental health. In one embodiment a chewing gum product is described that includes a gum base, dispersed particles of organic encapsulated sodium bicarbonate, and a bulk sweetener. The sodium bicarbonate ingredient is a novel composition of particles having a co-encapsulated content of a flavouring ingredient.

WO 97/12523 A1 discloses a chewing gum product, which has a content of one or more active ingredients for improved dental health. In one embodiment a chewing gum product has a content of ingredients, which includes a gum base, dispersed particles of organic encapsulated sodium bicarbonate, a bulk sweetener, and a flavour.

U.S. Pat. No. 4,357,354 describes a reduced calorie chewing gum which does not decrease in viscosity upon chewing and contains less the 65% of water soluble, such as sugar and/or sugar alcohol's as sweeteners, and includes gum base containing high level of inert fillers, such as calcium carbonate or talc in a amount of at least 40% by weight, softeners, such as lecithin, and optional synthetic non-caloric sweeteners, such as aspartame, saccharin, or cyclamates. The chewing gum includes at least about 10% air voids entrapped in the gum base matrix which, upon chewing becomes filled with moisture causing dramatic increase in cud size.

U.S. Pat. No. 4.698.223 discloses a chewing gum composition, which comprises up to 99% by weight of a completely sugar-free base gum. Such a chewing gum is calorie-free and non-cariogenic. Furthermore it has been found to be substantially non-adhesive to the teeth, particularly to dental prostheses. The gum contains up to 3% flavourings and up to 4% glycerol.

DETAILED DESCRIPTION OF THE INVENTION

The present invention relates to an aerated sugarless gum product with improved oral properties, low calorie, low-density and with a gum base content above 90%. The product is aerated to improve flexibility and softness. The preferred density of the product is between 0.50 gram/milliliter to 0.90 gram/milliliter.

The product in the present invention has a pure white color and the kilocalorie value is below 1 kilocalorie per piece and shows excellent teeth cleaning properties.

A mixture of carbonates and bicarbonates is added to improve oral hygiene by neutralising the acid created from bacterial degradation of remaining food particles in mouth after intake of foods. Besides, by keeping the pH above 5.5 the risk of carries is reduced significantly.

The gum of the present invention contains a gum base, additives such as carbonates and bicarbonates or mixtures hereof, flavorings, other additives like intensive sweeteners and plasticisers.

Furthermore, the invention relates to the use of a gum base containing a mixture of the selected components. The gum will have a gum base content of at least 90%.

The gum of the present invention contains at least one carbonate and one bicarbonate selected from the following materials, potassium carbonate, potassium hydrogen carbonate, sodium carbonate, sodium hydrogen carbonate or mixtures hereof.

The gum of the present invention contains at least one intensive sweetener selected from aspartame, acesulfame K, neohesperidine, alitame, sucralose, sodium saccharin, cyclamate or mixtures hereof.

The gum of the present invention can be added up to 5% of aquarius plasticizer to improve the process properties of the gum and to improve flexibility of the finished gum.

Furthermore the present invention relates to a gum composed from the following selected components:

The preferred elastomers for the gum base composition of the invention are selected from a group containing among styrene butadiene copolymer (SBR rubber), polyisobutylene rubber with a molecular weight between 40.000 Flory to 1.400.000 Flory, isoprene isobutylene rubber (butyl rubber), polyvinyl acetate with a molecular weight of minimum 2000, polyvinyl acetate, vinyl laureate copolymer, polyvinyl alcohol, or hevea brasiliensis or mixtures hereof.

The preferred resins for the gum base composition of the invention is selected from a group containing glycerol ester of gum rosin, glycerol ester of wood rosin, glycerol ester of tall oil rosin, glycerol ester of gum rosin, glycerol ester of dimerized gum rosin, glycerol ester of dimerized wood rosin, glycerol ester of dimerized tall oil rosin, glycerol ester of polymerised gum rosin, glycerol ester of polymerised wood rosin, glycerol ester of polymerised tall oil rosin, glycerol ester of partially hydrogenated gum rosin, glycerol ester of partially hydrogenated wood rosin, penta eutritol ester of hydrogenated gum or wood rosin, methyl ester of partially hydrogenated gum or wood rosin, polymerised terpene resins based on monomers alpha pinene, beta pinene, and deltalimonene (dipentene) or mixtures hereof where the final polymer has a ring and ball softening point between 60 to 130° C.

The preferred natural gums for the gum base composition of the invention is selected among sorva, sorvinha, chicle, jelutong, niger gutta, gutta hang kang, and masaeranduba balata or mixtures thereof.

The preferred fillers for the gum base composition of the invention is selected from a group containing calcium carbonate, calcium phosphate, di-calcium phosphate, tri-calcium phosphate, kaolin, talc, aluminium oxide and silicium oxide.

The preferred plasticisers for the gum base composition of the invention is selected from a group containing mono di-glyceride from edible fat or oil, distilled monoglyceride from edible fat or oil, acetylated monoglyceride, micro crystalline wax, paraffin wax, bee wax, candelilla wax, petroleum wax, lanolin, triacetin, partially or fully hydrogenated vegetable oil from soybean, coconut, palm, rape seed, peanut, shea nut, corn, cotton seed, or sunflower oil or mixtures hereof.

If required, the gum base may also contain different auxiliary ingredients preferably being selected among the antioxidants, such as butyl hydroxyanisole, butyl hydroxytoluene, propyl gallate, or tocopherols, inorganic or organic colorants, and sodium stearate, potassium stearate and sodium sulfide.

The invention is described further below by means of the following examples.

EXAMPLES

|  | Example 1 | Example 2 | Example 3 |
| --- | --- | --- | --- |
| Gum base | 97.8% | 96.7% | 95.7% |
| Potassium carbonate | 00.2% |  | 01.0% |
| Potassium bicarbonate | 00.3% |  | 00.5% |
| Sodium carbonate |  | 00.5% |  |
| Sodium bicarbonate |  | 01.0% |  |
| Flavor | 01.0% | 01.2% | 02.0% |
| Spice extract | 00.5% |  | 00.5% |
| Aspartame | 00.1% |  | 00.2% |
| Acesulfame K |  |  | 00.1% |
| Sodium saccharin | 00.1% | 00.2% |  |
| Cyclamate |  | 00.1% |  |
| Plasticizer |  | 00.3% |  |
| Total | 100.0% | 100.0% | 100.0% |

|  | Example 4 | Example 5 | Example 6 |
| --- | --- | --- | --- |
| Gum base | 93.7% | 93.7% | 93.7% |
| Potassium carbonate | 01.6% | 01.6% | 00.8% |
| Potassium bicarbonate | 03.0% |  | 01.5% |
| Sodium carbonate |  |  | 00.8% |
| Sodium bicarbonate |  | 03.0% | 01.5% |
| Flavor | 01.4% | 01.4% | 01.4% |
| Spice extract |  |  |  |
| Aspartame |  |  |  |
| Acesulfame K |  |  |  |
| Sodium saccharin | 00.2% | 00.2% | 00.2% |
| Cyclamate | 00.1% | 00.1% | 00.1% |
| Plasticizer |  |  |  |
| Total | 100.0% | 100.0% | 100.0% |

-continued

|  | Example 7 | Example 8 | Example 9 |
|---|---|---|---|
| Gum base | 93.7% | 93.7% | 93.7% |
| Potassium carbonate |  |  | 00.8% |
| Potassium bicarbonate | 03.0% |  | 01.5% |
| Sodium carbonate | 01.6% | 01.6% | 00.8% |
| Sodium bicarbonate |  | 03.0% | 01.5% |
| Flavor | 01.4% | 01.4% | 01.4% |
| Spice extract |  |  |  |
| Aspartame |  |  |  |
| Acesulfame K |  |  |  |
| Sodium saccharin | 00.2% | 00.2% | 00.2% |
| Cyclamate | 00.1% | 00.1% | 00.1% |
| Plasticizer |  |  |  |
| Total | 100.0% | 100.0% | 100.0% |

|  | Example 10 | Example 11 | Example 12 |
|---|---|---|---|
| Gum base | 93.7% | 93.7% | 93.7% |
| Encap. K2CO3 20% actives | 01.6% | 01.6% | 00.8% |
| Encap. KHCO3 20% actives | 03.0% |  | 01.5% |
| Encap Na2CO3 20% actives |  |  | 00.8% |
| Encap NaHCO3 20% actives |  | 03.0% | 01.5% |
| Flavor | 01.4% | 01.4% | 01.4% |
| Spice extract |  |  |  |
| Aspartame |  |  |  |
| Acesulfame K |  |  |  |
| Sodium saccharin | 00.2% | 00.2% | 00.2% |
| Cyclamate | 00.1% | 00.1% | 00.1% |
| Plasticizer |  |  |  |
| Total | 100.0% | 100.0% | 100.0% |

|  | Example 13 | Example 14 | Example 15 |
|---|---|---|---|
| Gum base | 93.7% | 93.7% | 93.7% |
| Encap. K2CO3 20% actives | 01.6% | 01.6% | 00.8% |
| Encap. KHCO3 20% actives | 03.0% |  | 01.5% |
| Encap Na2CO3 20% actives |  |  | 00.8% |
| Encap NaHCO3 20% actives |  | 03.0% | 01.5% |
| Flavor | 01.4% | 01.4% | 01.4% |
| Spice extract |  |  |  |
| Aspartame | 00.2% |  | 00.1% |
| Acesulfame K | 00.1% | 00.2% | 00.1% |
| Sodium saccharin |  | 00.1% |  |
| Cyclamate |  |  | 00.1% |
| Plasticizer |  |  |  |
| Total | 100.0% | 100.0% | 100.0% |

|  | Example 16 | Example 17 | Example 18 |
|---|---|---|---|
| Gum base | 92.2% | 92.5% | 92.5% |
| Encap. K2CO3 20% actives | 01.6% | 01.6% | 00.8% |
| Encap. KHCO3 20% actives | 03.0% |  | 01.5% |
| Encap Na2CO3 20% actives |  |  | 00.8% |
| Encap NaHCO3 20% actives |  | 03.0% | 01.5% |
| Flavor | 01.4% | 01.4% | 01.4% |
| Spice extract | 00.3% |  |  |
| Encap. Aspartame 20% actives | 01.0% |  | 00.5% |
| Encap. acesulfame K 20% actives | 00.5% | 01.0% | 00.5% |
| Encap Na saccharin 20% actives |  | 00.5% |  |
| Encap. Cyclamate 20% actives |  |  | 00.5% |
| Plasticizer |  |  |  |
| Total | 100.0% | 100.0% | 100.0% |

|  | Example 19 | Example 20 | Example 21 |
|---|---|---|---|
| Gum base | 91.5% | 92.0% | 90.5% |
| Potassium carbonate | 01.6% | 01.6% | 00.8% |
| Potassium bicarbonate | 03.0% |  | 01.5% |
| Sodium carbonate |  |  | 00.8% |
| Sodium bicarbonate |  | 03.0% | 01.5% |
| Flavor | 01.4% | 01.4% | 01.4% |
| Spice extract |  | 00.3% |  |
| Encap. Aspartame 20% actives | 01.0% |  | 00.5% |
| Encap. acesulfame K 20% actives | 00.5% | 01.0% | 00.5% |
| Encap Na saccharin 20% actives |  | 00.5% |  |
| Encap. Cyclamate 20% actives |  |  | 00.5% |
| Plasticizer | 01.0% | 00.2% | 02.0% |
| Total | 100.0% | 100.0% | 100.0% |

|  | Example 22 | Example 23 | Example 24 |
|---|---|---|---|
| Gum base | 91.5% | 92.3% | 91.3% |
| Encap. K2CO3 20% actives | 01.6% | 01.6% | 00.8% |
| Encap. KHCO3 20% actives | 03.0% |  | 01.5% |
| Encap Na2CO3 20% actives |  |  | 00.8% |
| Encap NaHCO3 20% actives |  | 03.0% | 01.5% |
| Flavor | 01.4% | 01.4% | 01.4% |
| Spice extract |  |  |  |
| Encap. Aspartame 20% actives | 01.0% |  | 00.5% |
| Encap. acesulfame K 20% actives | 00.5% | 01.0% | 00.5% |
| Encap Na saccharin 20% actives |  | 00.5% |  |
| Encap. Cyclamate 20% actives |  |  | 00.5% |
| Plasticizer | 01.0% | 00.2% | 01.2% |
| Total | 100.0% | 100.0% | 100.0% |

A test was conducted to measure saliva after chewing the gum by 8 persons and test results are shown on the attached Chart. Saliva was collected after 0, 3, 5, 10, 20, and 30 minutes and pH of saliva was measured.

The invention claimed is:

1. A low-calorie sugarless plaque-reducing aerated chewing gum product, consisting essentially of:
   gum base comprising between 90 percent and 99 percent by weight of the gum product;
   a plaque-inhibiting ingredient combining both a carbonate salt and a bicarbonate salt for demineralizing saliva in the mouth during chewing of the gum product, wherein the weight ratio of the carbonate salt to the bicarbonate salt is between 10:1 and 1:10; and
   at least one of a flavor and an intensive sweetener;
   the gum product being aerated to improve softness and flexibility of the gum product.

2. The low-calorie sugarless plaque-reducing chewing gum product of claim 1, wherein the intensive sweetener is selected from the group consisting of aspartame, acetsulfame K, neohesperidine, alitame, sucralose, saccharin, sodium cyclamate, and mixtures thereof.

3. The low-calorie sugarless plaque-reducing chewing gum product of claim 1, wherein the carbonate salt is present in an amount of 0.1 percent to 2 percent by weight of the gum product.

4. The low-calorie sugarless plaque-replacing chewing gum product of claim 1, wherein the bicarbonate salt is present in an amount of 0.1 percent to 3 percent by weight of the gum product.

5. The low-calorie sugarless plaque-reducing chewing gum product of claim 1, wherein the intensive sweetener is present in an amount of 0.01 percent to 1.5 percent by weight of the gum product.

6. The low-calorie sugarless plaque-reducing chewing gum product of claim 1, wherein the gum base comprises an elastomer selected from the group consisting of styrene butadiene copolymer, polyisobutylene rubber with a molecular %% eight between 40.000 Flory and 1.400.000 Flory, isoprene isobutylene rubber, polyvinyl acetate with a molecular weight of at least 2000, polyvinyl acetate, vinyl laureate copolymer, polyvinyl alcohol, hevea brasiliensis, and mixtures thereof.

7. The low-calorie sugarless plaque-reducing chewing gum product of claim 1, wherein the gum base contains a natural elastomer selected from the group consisting of sorva, sorvinha, chicle, jelutong, niger gutta, gutta hang kang, masaeranduba balata, and mixtures thereof.

8. The low-calorie sugarless plaque-reducing chewing gum product of claim 1, wherein the gum base contains a resinous elastomer solvent selected from the group consisting of glycerol ester of gum rosin, glycerol ester of wood rosin, glycerol ester of tall oil rosin, glycerol ester of dimerized gum rosin, glycerol ester of dimerized wood rosin, glycerol ester of dimerized tall oil rosin, glycerol ester of polymerized gum rosin, glycerol ester of polymerized wood rosin, glycerol ester of polymerized tall oil rosin, glycerol ester of partially hydrogenated gum rosin, glycerol ester of partially hydrogenated wood rosin, pentaeutritol ester of hydrogenated gum or wood rosin, methyl ester of partially hydrogenated wood rosin, and polymerized terpene resins based on monomers alpha pinene, beta pinene, and deltalimonene (dipentene), and mixtures thereof where the gum base has a ring and ball softening point between 60° C. and 130° C.

9. The low-calorie sugarless plaque-reducing chewing gum product of claim 1, wherein the gum base includes a filler.

10. The low-calorie sugarless plaque-reducing chewing gum product of claim 1, wherein the carbonate salt comprises at least one of potassium carbonate and sodium carbonate.

11. The low-calorie sugarless plaque-reducing chewing gum product of claim 1, wherein the bicarbonate salt comprises at least one of potassium bicarbonate and sodium bicarbonate.

12. The low-calorie sugarless plaque-reducing chewing gum product of claim 1, wherein the flavor is selected from the group consisting of liquid spice extracts, flavors, and oils; spray-dried spice extract, flavors, and oils; encapsulated spice extracts, flavors, and oils; and mixtures thereof.

13. The low-calorie sugarless plaque-reducing chewing gum product of claim 1, wherein the plaque-inhibiting ingredient is added as a dry powder.

14. The low-calorie sugarless plaque-reducing chewing gum product of claim 1, wherein the plaque-inhibiting ingredient is encapsulated with a carrier.

15. The low-calorie sugarless plaque-reducing chewing gum product of claim 1, wherein the intensive sweetener is included, and the plaque-inhibiting ingredient and the intensive sweetener are encapsulated together.

16. The low-calorie sugarless plaque-reducing chewing gum product of claim 15, wherein the plaque-inhibiting ingredient and the intensive sweetener are encapsulated together by one of a fluid bed, spray cooling, coacervation, and flash melt spinning process, and then coated with vegetable oil or wax.

17. The low-calorie sugarless plaque-reducing chewing gum product of claim 1, wherein the gum product is aerated to have a density between 0.5 and 0.9 grams per milliliter.

* * * * *

UNITED STATES PATENT AND TRADEMARK OFFICE
CERTIFICATE OF CORRECTION

PATENT NO. : 7,070,818 B1  Page 1 of 1
APPLICATION NO. : 10/240440
DATED : July 4, 2006
INVENTOR(S) : Nielsen et al.

It is certified that error appears in the above-identified patent and that said Letters Patent is hereby corrected as shown below:

Column 9,
Line 5, "%% eight" should read --weight--.

Signed and Sealed this

Thirtieth Day of January, 2007

JON W. DUDAS
*Director of the United States Patent and Trademark Office*